United States Patent
Mandil et al.

(10) Patent No.: US 9,603,066 B2
(45) Date of Patent: Mar. 21, 2017

(54) EMBMS SERVICE CONTINUITY DURING UE MOBILITY

(71) Applicant: QUALCOMM Incorporated, San Diego, CA (US)

(72) Inventors: Amit Mandil, Andhra Pradesh (IN); Daniel Amerga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 270 days.

(21) Appl. No.: 13/652,323

(22) Filed: Oct. 15, 2012

(65) Prior Publication Data

US 2013/0336173 A1 Dec. 19, 2013

Related U.S. Application Data

(60) Provisional application No. 61/661,176, filed on Jun. 18, 2012.

(51) Int. Cl.
*H04W 36/00* (2009.01)
*H04W 72/00* (2009.01)
(Continued)

(52) U.S. Cl.
CPC ..... *H04W 36/0072* (2013.01); *H04W 72/005* (2013.01); *H04W 48/12* (2013.01); *H04W 76/002* (2013.01)

(58) Field of Classification Search
CPC ... H04W 72/005; H04W 4/06; H04W 84/047; H04W 24/10; H04W 72/042; H04W 48/16; H04W 72/04; H04W 74/0833; H04W 88/04; H04W 88/08; H04W 28/06; H04W 68/12; H04W 72/0426; H04W 72/12; H04J 11/0093; H04L 5/0035

USPC ....... 370/312, 329, 315, 252, 280, 311, 328, 370/203, 241, 208, 230, 310.2, 335, 336, 370/338, 498
See application file for complete search history.

(56) References Cited

U.S. PATENT DOCUMENTS 8,195,166 B1 6/2012 Oprescu-Surcobe et al.
2008/0287129 A1* 11/2008 Somasundaram ........................ H04W 36/0055
455/436

(Continued)

OTHER PUBLICATIONS

Bell, A-L.S., et al., "Enhancement of cell reselection for MBMS service continuity", 3GPP Draft; R2-112230, 3rd Generation Partnership Project (3GPP), Mobile Competence Centr; 650, Route Des Lucioles; F-06921 Sophia-Antipolis Cedex; France, vol. RAN WG2, No. Shanghai, China; 20110411, Apr. 4, 2011, XP050494395, [retrieved on Apr. 4, 2011].

(Continued)

*Primary Examiner* — Charles C Jiang
*Assistant Examiner* — Oussama Roudani
(74) *Attorney, Agent, or Firm* — Arent Fox LLP

(57) ABSTRACT

A method, an apparatus, and a computer program product for wireless communication are provided. The apparatus receives an MBMS service from a first cell based on first cell MBSFN service configuration information of the first cell. The apparatus switches from being served by the first cell to a second cell. The apparatus attempts to receive the MBMS service from the second cell by utilizing the first cell MBSFN service configuration information prior to obtaining second cell MBSFN service configuration information of the second cell.

29 Claims, 11 Drawing Sheets

(51) Int. Cl.
  *H04W 76/00* (2009.01)
  *H04W 48/12* (2009.01)

(56) References Cited

U.S. PATENT DOCUMENTS

| | | |
|---|---|---|
| 2011/0149827 A1 | 6/2011 | Na et al. |
| 2011/0222457 A1 | 9/2011 | Lee et al. |
| 2011/0263262 A1 | 10/2011 | Min et al. |
| 2011/0305184 A1* | 12/2011 | Hsu ............................. 370/312 |
| 2012/0099505 A1 | 4/2012 | Wang et al. |
| 2012/0213145 A1* | 8/2012 | Aminaka et al. ............. 370/312 |
| 2012/0257562 A1* | 10/2012 | Kim et al. .................... 370/312 |
| 2013/0114498 A1* | 5/2013 | Park et al. .................... 370/312 |
| 2013/0178220 A1 | 7/2013 | Lee et al. |
| 2013/0329625 A1* | 12/2013 | Lee et al. ...................... 370/312 |
| 2014/0010195 A1* | 1/2014 | Angelow et al. ............. 370/329 |
| 2014/0064133 A1* | 3/2014 | Kazmi et al. ................. 370/252 |

OTHER PUBLICATIONS

Bell, A-L.S., et al., "Neighbouring cell MBMS service information for service continuity", 3GPP Draft; R2-114280, 3rd Generation Partnership Project (3GPP), vol. RAN WG2, No. Athens, Greece; 20110822, Aug. 15, 2011, XP050539734.
International Search Report and Written Opinion—PCT/US2013/045406—ISA/EPO—Sep. 27, 2013.

* cited by examiner

EMBMS SERVICE CONTINUITY DURING UE MOBILITY

CROSS-REFERENCE TO RELATED APPLICATION(S)

This application claims the benefit of U.S. Provisional Application Ser. No. 61/661,176, entitled "EMBMS SERVICE CONTINUITY DURING UE MOBILITY" and filed on Jun. 18, 2012, which is expressly incorporated by reference herein in its entirety.

BACKGROUND

Field

The present disclosure relates generally to communication systems, and more particularly, to evolved Multimedia Broadcast Multicast Service (eMBMS) service continuity during user equipment (UE) mobility.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus receives a multimedia broadcast multicast service (MBMS) service from a first cell based on first cell Multicast Broadcast Single Frequency Network (MBSFN) service configuration information of the first cell. The apparatus switches from being served by the first cell to a second cell. The apparatus attempts to receive the MBMS service from the second cell by utilizing the first cell MBSFN service configuration information prior to obtaining second cell MBSFN service configuration information of the second cell.

DETAILED DESCRIPTION

Figure 1:
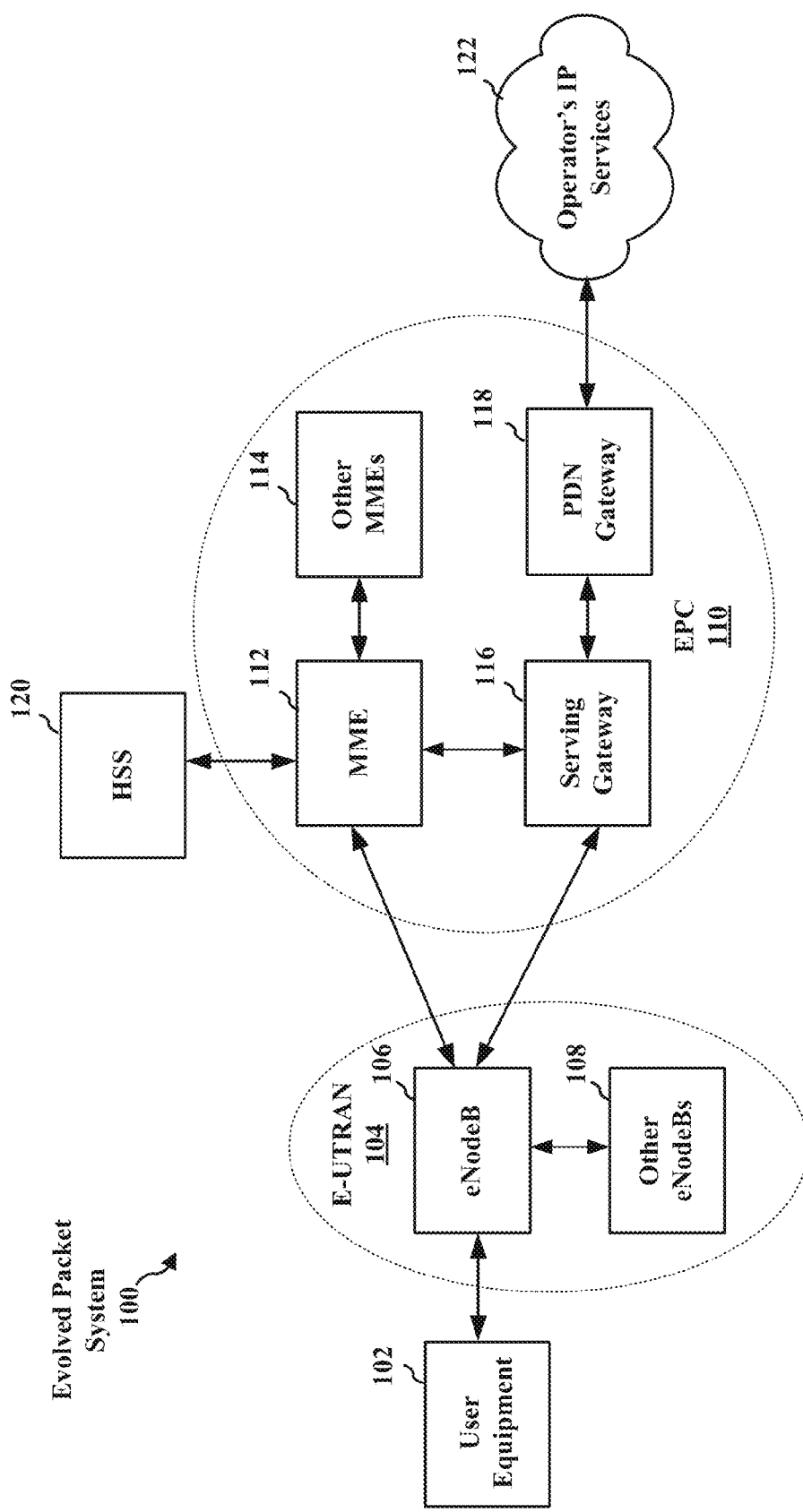
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more UE 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
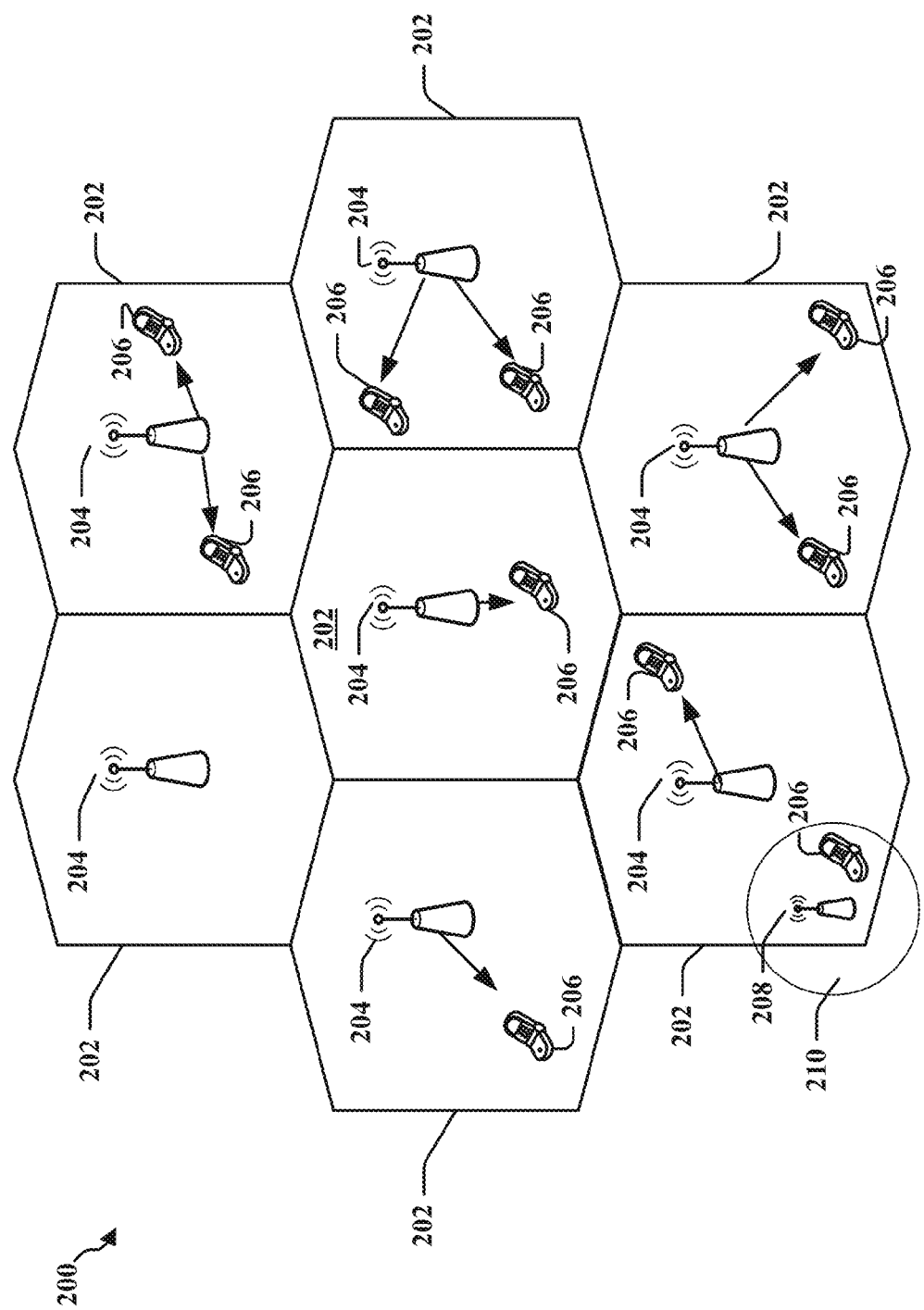
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
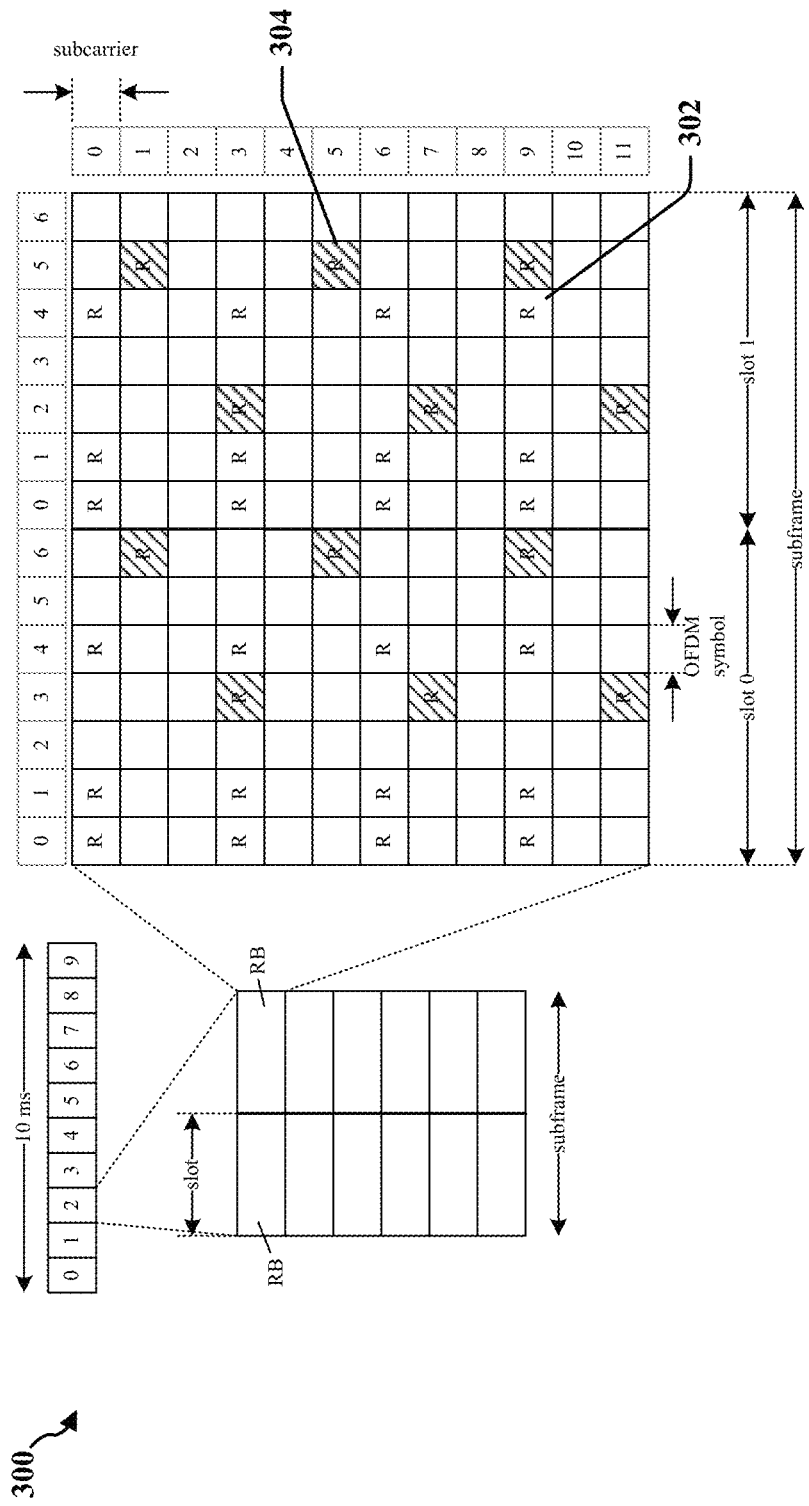
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
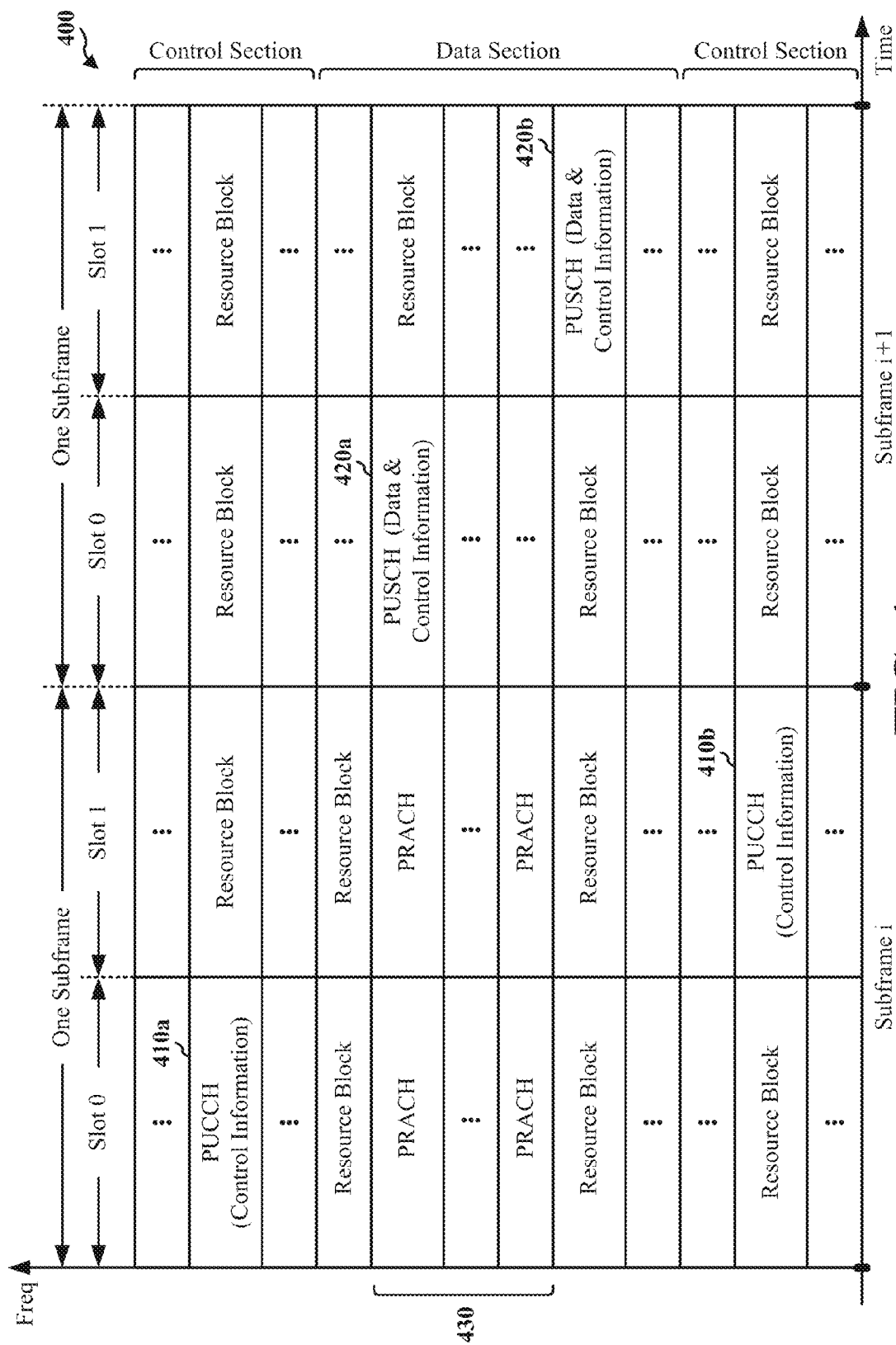
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
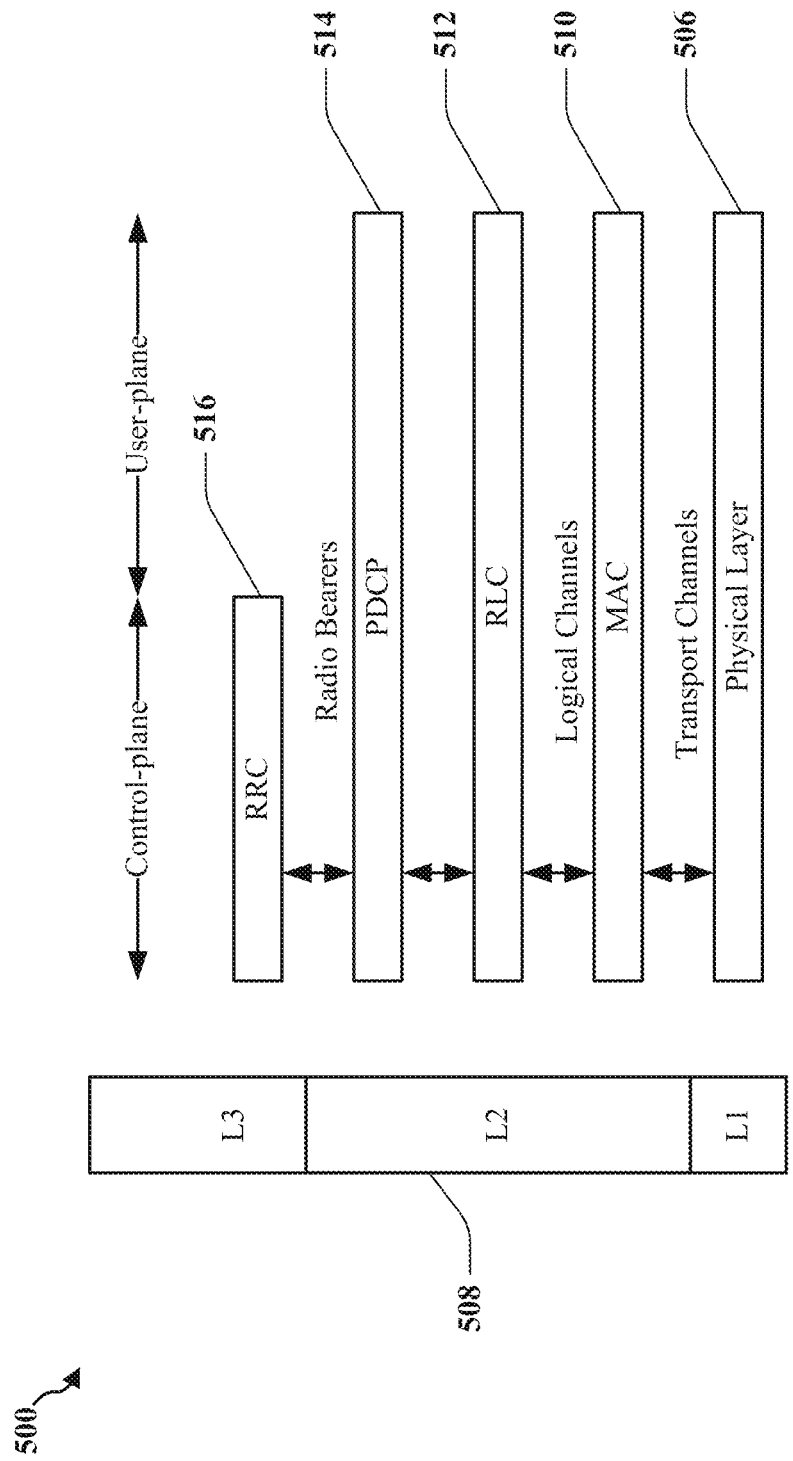
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
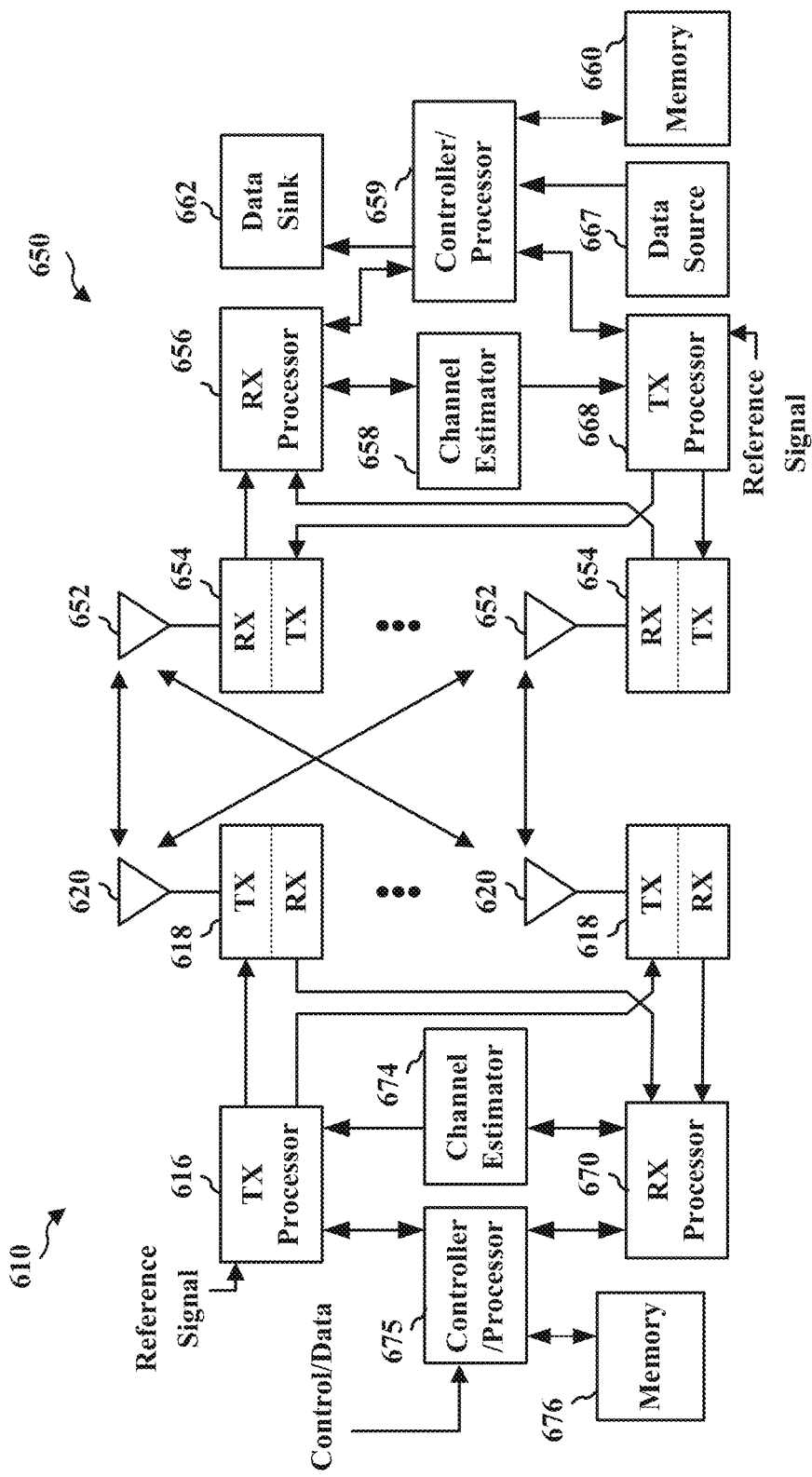
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
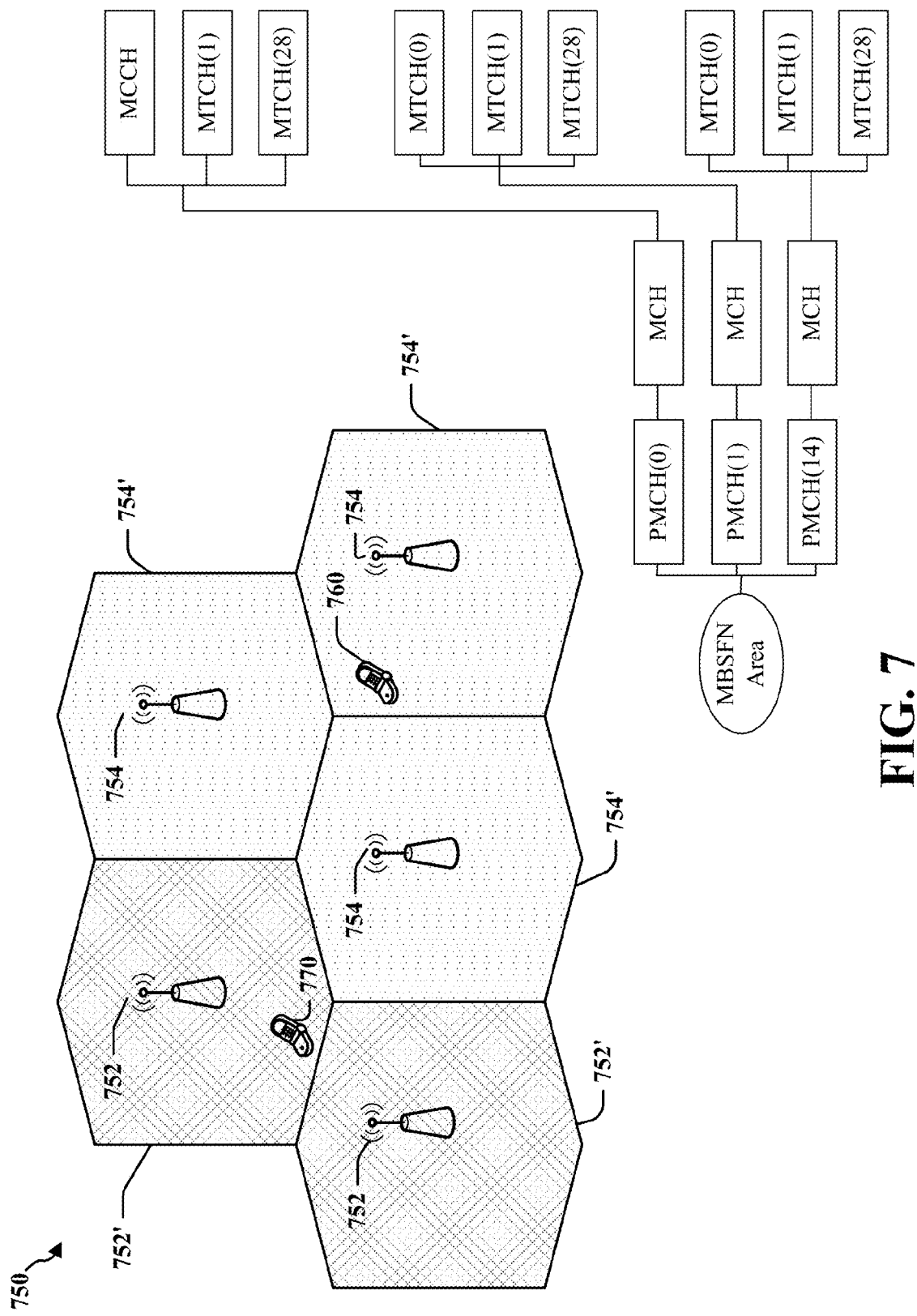
FIG. 7 is a diagram illustrating eMBMS in an MBSFN.

FIG. 7 is a diagram 750 illustrating eMBMS in an MBSFN. The eNBs 752 in cells 752' may form a first MBSFN area and the eNBs 754 in cells 754' may form a second MBSFN area. The eNBs 752, 754 may be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

When an eMBMS capable UE moves from being served by a source cell to a target cell (e.g., through reselection or handover), the UE acquires from the target cell a system information block 2 (SIB2) to determine an MBSFN subframe allocation (e.g., zero or more of subframes 1, 2, 3, 6, 7, 8 for FDD and zero or more of subframes 3, 4, 7, 8, 9 for TDD) of the target cell, a system information block 13 (SIB13) to determine the MBSFN subframes on which the MCCH can be received from the target cell, and MCCH information on the MCCH to determine the MBSFN area configuration information including a PMCH allocation of the target cell. The MBSFN subframe allocation provided in the SIB2, the MBSFN subframes on which the MCCH can be received provided in the SIB13, and the MCCH information including MBSFN area configuration information provided in the MCCH are referred to as MBSFN service configuration information. Upon obtaining the MBSFN service configuration information, the UE can resume/start receiving the eMBMS service. If the UE is receiving an eMBMS service from the source cell before the move to the target cell, the cell change from the source cell to the target cell can cause a disruption in the eMBMS service while the UE waits to obtain the MBSFN service configuration information. As such, a method is provided infra for eMBMS service continuity during UE mobility.

Figure 8:
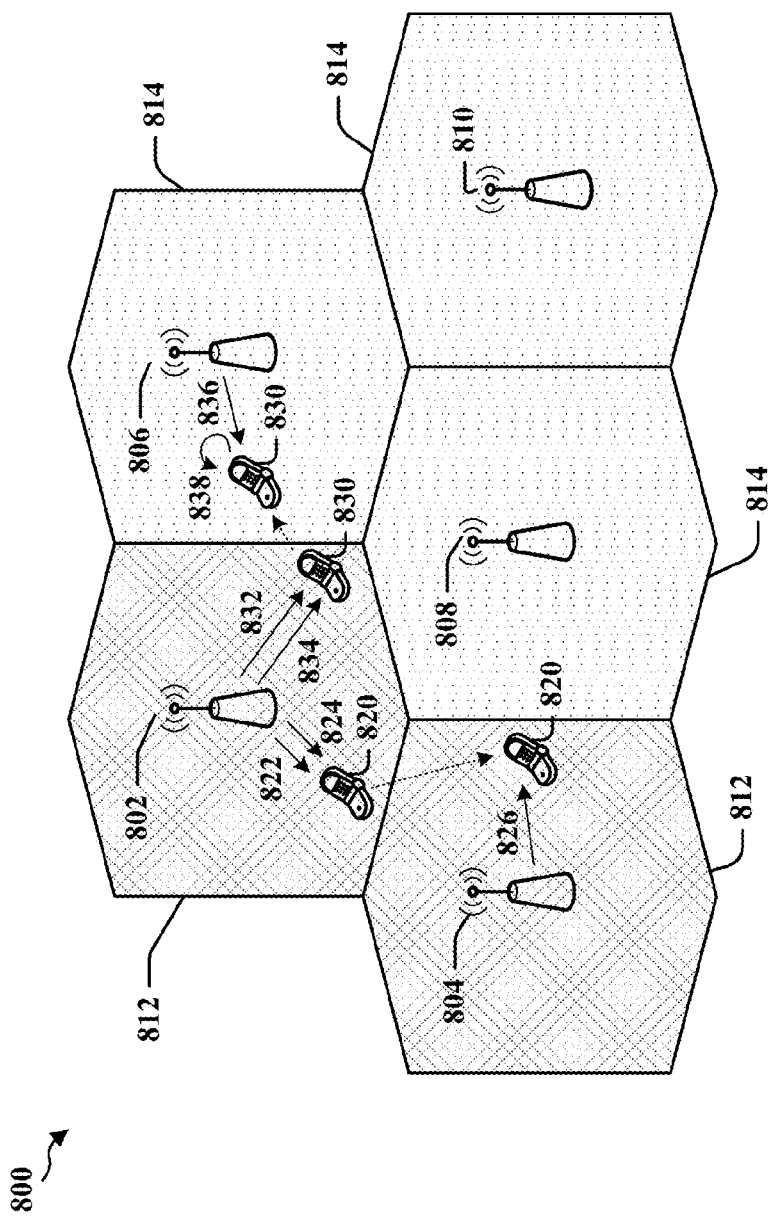
FIG. 8 is a diagram for illustrating an exemplary method.

FIG. 8 is a diagram 800 for illustrating an exemplary method. The eNBs 802, 804 in cells 812 form a first MBSFN area and the eNBs 806, 808, 810 in cells 814 form a second MBSFN area. The eNBs 802, 804 in the first MBSFN area synchronously transmit the same eMBMS control information and data and the eNBs 806, 808, 810 in the second MBSFN area synchronously transmit the same eMBMS control information and data. The UE 820 is receiving an eMBMS service 822. The UE 820 also receives neighbor cell configuration information 824, which includes MBSFN and TDD UL/DL configuration information of the neighbor cells. The neighbor cell configuration information 824 is included within a NeighCellConfig information element (IE). In an idle mode, the UE 820 may receive the NeighCellConfig IE within a system information block 3 (SIB3) that provides intra-frequency (i.e., same operating frequency as the eNB 802) neighbor cell configuration information or within a system information block 5 (SIB5) that provides inter-frequency (i.e., different operating frequency as the eNB 802) neighbor cell configuration information. In a connected mode, the UE 820 may receive the NeighCellConfig IE within a MeasObjectEUTRA IE for both intra-frequency and inter-frequency neighbor cell configuration information. The NeighCellConfig IE includes the bits "11" if the neighboring cells have a different UL/DL subframe allocation for TDD as compared to the eNB 802. Otherwise, the NeighCellConfig IE may include the bits "00" if not all neighbor cells have the same MBSFN subframe allocation as the eNB 802, the bits "10" if the MBSFN subframe allocations of all neighbor cells are identical to or are subsets of the MBSFN subframe allocation of the eNB 802, or the bits "01" if no MBSFN subframes are present in all the neighboring cells.

The UE 820 uses the neighbor cell configuration information 824 to determine whether the neighboring cells are not within the same MBSFN area as the eNB 802 or may be within the same MBSFN area as the eNB 802. Specifically, the UE 820 may determine that the neighboring cells on a specific DL frequency are not within the same MBSFN area if the UE 820 receives a NeighCellConfig IE including bits "01" for neighbor cell frequency present in either SIB3 or SIB5 for UE idle mode or in MeasObjectEUTRA IE for UE connected mode. When the NeighCellConfig IE includes the bits "01," the UE knows that the neighboring cells do not provide eMBMS services. A NeighCellConfig IE in SIB5 indicates MBMS and TDD configuration related information for neighbor cells that are operating on a different frequency than the eNB 802 for idle mode. A NeighCellConfig IE in SIB3 indicates MBMS and TDD configuration related information for neighbor cells that are operating on the same frequency as the eNB 802 for idle mode. A NeighCellConfig IE in MeasObjectEUTRA indicates MBMS and TDD configuration related information for neighbor cells that are operating on the same frequency and a different frequency than eNB 802 for connected mode. However, when the UE 820 receives a NeighCellConfig IE that includes the bits "00," "10," or "11" in the SIB3 or the SIB5 or the MeasObjectEUTRA, the UE determines that the neighboring cells may or may not be within the same MBSFN area.

If the UE 820 determines based on the neighbor cell configuration information 824 that the neighboring cells may be within the same MBSFN area as the eNB 802, when the UE 820 moves from being served by the eNB 802 to the eNB 804, the UE 820 attempts to receive the eMBMS service 826 from the eNB 804 by utilizing the MBSFN service configuration information of the eNB 802 until the UE 820 obtains the MBSFN service configuration information of the eNB 804. Using the MBSFN service configuration information of the eNB 802 when attempting to receive the eMBMS service 826 from the eNB 804 may prevent loss of eMBMS data and therefore may prevent a disruption of any eMBMS service that the UE 820 is receiving during the move from being served by the eNB 802 to the eNB 804.

In some situations, the UE may be wrong to assume that the MBSFN service configuration information of the eNB 802 may be applied to the target eNB. For example, the UE 830 is receiving an eMBMS service 832. The UE 830 also receives neighbor cell configuration information 834. If the UE 830 determines based on the neighbor cell configuration information 834 that the neighboring cells may be within the same MBSFN area as the eNB 802, when the UE 830 moves from being served by the eNB 802 to the eNB 806, the UE 830 attempts to receive the eMBMS service 836 from the eNB 806 by utilizing the MBSFN service configuration information of the eNB 802 until the UE 830 obtains the MBSFN service configuration information of the eNB 806. Using the MBSFN service configuration information of the eNB 802 when attempting to receive the eMBMS service 836 from the eNB 806 may not prevent a disruption of an eMBMS service that the UE 830 is receiving, as the eNB 806 is in a different MBSFN area, which may not belong to the same MBSFN synchronization area as the eNB 802, and therefore may have a different MBSFN subframe allocation and/or different MCCH information including different PMCH allocations and different services.

When the UE 830 fails in the attempt to receive the eMBMS service 836 after moving to eNB 806 using the MBSFN service configuration information of the eNB 802, the UE 830 discards 838 the packets received through the attempt to receive the eMBMS service 836. The UE 830 may discard 838 the packets based on information included in a header of the packets, such as service identification information, logical channel identifiers (LCIDs), and/or other information. Specifically, the UE 830 may determine that packets received in the attempt to receive the eMBMS service 836 include information, such as service identification information, LCIDs, and/or other information that does not match with information expected for the eMBMS service 836. Upon such a determination, the UE 830 may determine that the attempt to receive the eMBMS service 836 failed and, consequently, discard the packets. The UE 830 may continue to discard 838 the packets until the UE 830 is able to obtain the MBSFN service configuration information of the eNB 806 MBSFN area.

Upon moving to the target eNBs, the UEs 820, 830 that attempt to receive the eMBMS service from the target eNBs using the MBSFN service configuration information of the eNB 802 may also attempt to receive a PDSCH on all of the potential MBSFN subframes, including the subframes indicated as MBSFN subframes in the MBSFN service configuration information of the eNB 802. For example, assuming an FDD system, if subframes 1, 2, 3, and 6 are allocated as MBSFN subframes for the eNB 802, the UEs 820, 830 will attempt to receive a PDSCH on the subframes 1, 2, 3, 6, 7, and 8. By attempting to receive the PDSCH on all of the potential MBSFN subframes, which may potentially be non-MBSFN subframes, the UEs 820, 830 prevent loss of data on the PDSCH if the target eNBs do not have the same MBSFN subframe allocation.

The method provided supra may prevent disruption of an eMBMS service through attempting to receive the eMBMS service from the target cell based on MBSFN service configuration information of the source cell. Attempting to receive the eMBMS service from the target cell based on the MBSFN service configuration information of the source cell may have minimal performance impact because the UE would otherwise be waiting to receive the MBSFN service configuration information after moving to the target cell before resuming reception of the eMBMS service.

Figure 9:
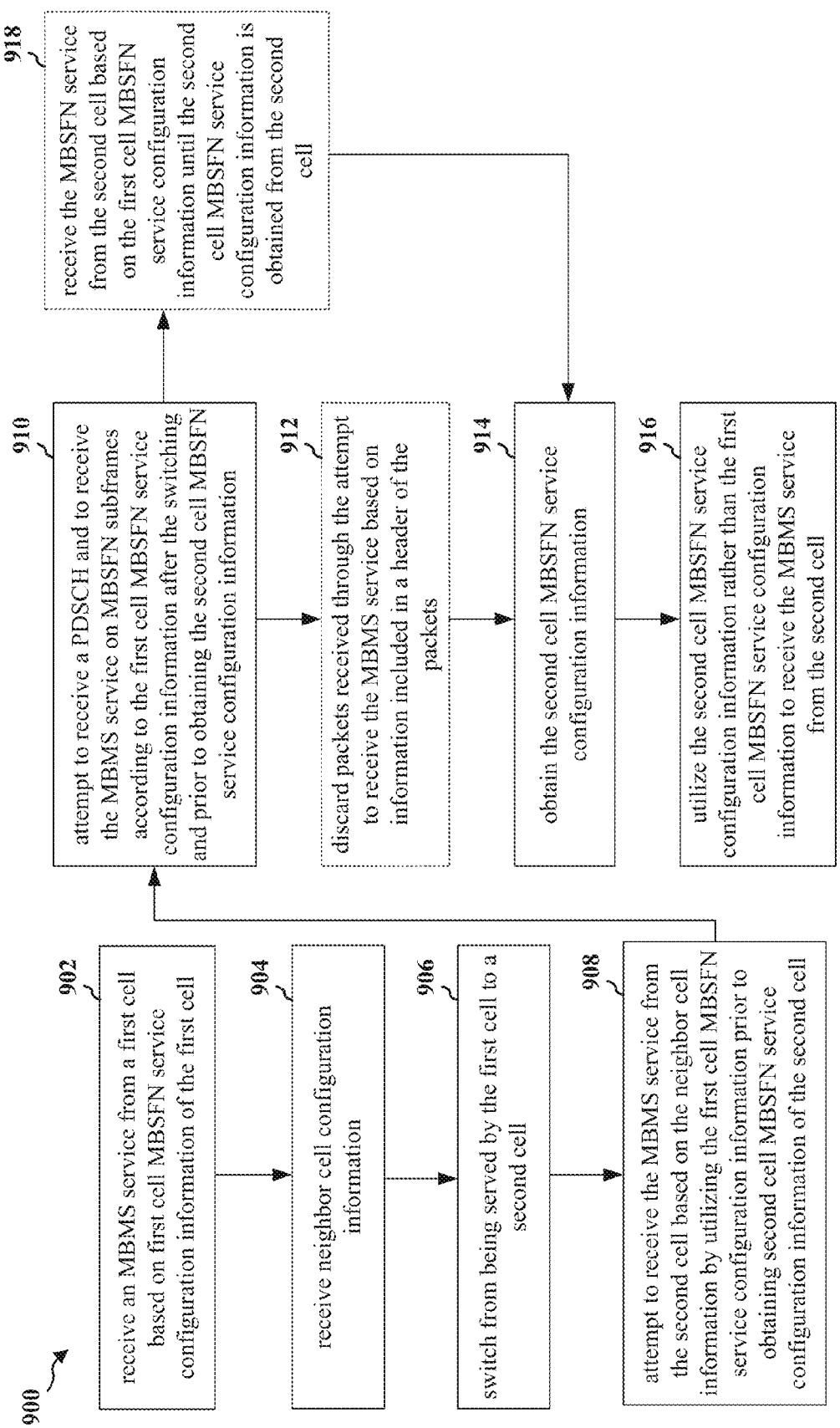
FIG. 9 is a flow chart of a method of wireless communication.

FIG. 9 is a flow chart 900 of a method of wireless communication. The method may be performed by a UE. At step 902, the UE receives an MBMS service from a first cell based on first cell MBSFN service configuration information of the first cell. For example, referring to FIG. 8, the UE 820 receives an eMBMS service 822 from the eNB 802 and the UE 830 receives an eMBMS service 832 from the eNB 802. The first cell MBSFN service configuration information of the first cell may include a SIB2 from the first cell including an MBSFN subframe allocation of the first cell, a SIB13 indicating MBSFN subframes on which an MCCH can be received on the first cell, and MCCH information providing MBSFN area configuration information of the first cell. At step 904, the UE receives neighbor cell configuration information. For example, referring to FIG. 8, the UE 820 receives neighbor cell configuration information 824 and the UE 830 receives neighbor cell configuration information 834. As discussed supra, the neighbor cell configuration information may be obtained in at least one of an IE within a SIB3 for intra-frequency neighbor cell configuration information or in an IE within a SIB5 for inter-frequency neighbor cell configuration information while in an idle mode, or in an IE within a measurement object such as the MeasObjectEUTRA for both intra-frequency neighbor cell configuration information and inter-frequency neighbor cell configuration information when in a connected mode. The UE may utilize the first cell MBSFN service configuration information for the second cell when the neighbor cell configuration information indicates that neighbor cells have MBSFN subframe allocations. For example, the UE may utilize the first cell MBSFN service configuration information for the second cell when the neighbor cell configuration information for target eNB frequency is received in a SIB3 or SIB5 for idle mode or a MeasObjectEUTRA IE for connected mode and includes bits "00," "10," or "11." Specifically, the UE may utilize the first cell MBSFN service configuration information for the second cell when the neighbor cell configuration information is received in a SIB3 or a MeasObjectEUTRA IE when the target eNB frequency is the same as source eNB frequency and indicates that neighbor cells have any one of a different MBSFN subframe allocation than the first cell (bits "00"), a different uplink/downlink subframe configuration for time division duplexing (TDD) than the first cell (bits "11"), a subset of the MBSFN subframe allocation of the first cell (bits "10'), or an identical MBSFN subframe allocation as the first cell (bits "10").

At step 906, the UE switches from being served by the first cell to a second cell. For example, referring to FIG. 8, the UE 820 switches from being served by the eNB 802 to being served by the eNB 804 and the UE 830 switches from being served by the eNB 802 to being served by the eNB 806. At step 908, the UE attempts to receive the MBMS service from the second cell by utilizing the first cell MBSFN service configuration information prior to obtaining second cell MBSFN service configuration information of the second cell. For example, referring to FIG. 8, the UE 820 attempts to receive the eMBMS service 826 from the eNB 804 by utilizing the MBSFN service configuration information of the eNB 802 prior to obtaining MBSFN service configuration information of the eNB 804. In addition, the UE 830 attempts to receive the eMBMS service 836 from the eNB 806 by utilizing the MBSFN service configuration information of the eNB 802 prior to obtaining MBSFN service configuration information of the eNB 806.

In one configuration, the second cell MBSFN service configuration information of the second cell includes a SIB13 from the second cell, but does not include a SIB2 from the second cell. In such a configuration, the UE attempts to receive the MBMS service from the second cell by utilizing the first cell MBSFN service configuration information prior to obtaining the SIB13 from the second cell, but not prior to obtaining the SIB2 from the second cell. Furthermore, in such a configuration, the UE may obtain the SIB2 from the second cell, and based on the information in the obtained SIB2, the UE may then determine to attempt to receive the MBMS service from the second cell by utilizing the first cell MBSFN service configuration information prior to obtaining the SIB13 from the second cell. In another configuration, the second cell MBSFN service configuration information of the second cell includes a SIB13 from the second cell and a SIB2 from the second cell. In such a configuration, the UE attempts to receive the MBMS service from the second cell by utilizing the first cell MBSFN service configuration information prior to obtaining the SIB2 and SIB13 from the second cell.

The first cell MBSFN service configuration information may include a SIB2 including an MBSFN subframe allocation of the first cell, a SIB13 indicating MBSFN subframes on which an MCCH can be received on the first cell, and MCCH information providing MBSFN area configuration information of the first cell. In a first configuration, the second cell MBSFN service configuration information may include a SIB13 indicating MBSFN subframes on which an MCCH can be received on the second cell, and MCCH information providing MBSFN area configuration information of the second cell. In such a configuration, as discussed supra, the UE obtains the SIB2 from the second cell, and prior to obtaining the SIB13 and the MCCH information from the second cell, the UE attempts to receive the MBMS service from the second cell by utilizing the first cell MBSFN service configuration information. The determination whether to attempt to receive the MBMS service from the second cell by utilizing the first cell MBSFN service configuration information may be based on the information in the obtained SIB2. In a second configuration, the second cell MBSFN service configuration information may include a SIB2 including an MBSFN subframe allocation of the second cell, a SIB13 indicating MBSFN subframes on which an MCCH can be received on the second cell, and MCCH information providing MBSFN area configuration information of the second cell. In such a configuration, as discussed supra, prior to obtaining the SIB2, the SIB13, and the MCCH information from the second cell, the UE attempts to receive the MBMS service from the second cell by utilizing the first cell MBSFN service configuration information.

The UE may utilize the first cell MBSFN service configuration information to receive the MBSFN service from the second cell until the second cell MBSFN service configuration information is obtained from the second cell. Accordingly, when the UE obtains the SIB2, but not the SIB13 or the MCCH information, from the second cell prior to attempting to receive the MBMS service from the second cell by utilizing the first cell MBSFN service configuration information, the UE may utilize the first cell MBSFN service configuration information to receive the MBSFN service from the second cell until the SIB13 and the MCCH information are obtained from the second cell. However, when the UE does not obtain the SIB2, SIB13, and the MCCH information from the second cell prior to attempting to receive the MBMS service from the second cell by utilizing the first cell MBSFN service configuration information, the UE may utilize the first cell MBSFN service configuration information to receive the MBSFN service from the second cell until the SIB2, SIB13, and the MCCH information are obtained from the second cell.

At step 910, the UE attempts to receive a PDSCH and to receive the MBMS service on MBSFN subframes according to the first cell MBSFN service configuration information after the switching and prior to obtaining the second cell MBSFN service configuration information. For example, referring to FIG. 8, the UE 820 attempts to receive a PDSCH and to receive the eMBMS service 826 on MBSFN subframes according to the MBSFN service configuration information of the eNB 802. As such, if the eNB 802 has allocated MBSFN subframes 1, 2, 3, and 6 for providing eMBMS services, the UE 820 attempts to receive both the PDSCH and the eMBMS service 826 on the subframes 1, 2, 3, and 6. In addition, the UE 830 attempts to receive a PDSCH and to receive the eMBMS service 836 on MBSFN subframes according to the MBSFN service configuration information of the eNB 802. As such, if the eNB 802 has allocated MBSFN subframes 3, 6, and 7 for providing eMBMS services, the UE 830 attempts to receive both the PDSCH and the eMBMS service 836 on the subframes 3, 6, and 7.

At step 912, the UE may discard packets received through the attempt to receive the MBMS service based on information included in a header of the packets. For example, referring to FIG. 8, the UE 830 discards 838 packets received through the failed attempt to receive the eMBMS service 836 based on information included in a header of the packets. In step 918, the UE may receive the MBSFN service from the second cell based on the first cell MBSFN service configuration information until the second cell MBSFN service configuration information is obtained from the second cell. For example, referring to FIG. 8, the UE 820 receives the MBSFN service 826 from the eNB 804 based on the MBSFN service configuration information until the MBSFN service configuration information is obtained from the eNB 804.

In step 914, the UE obtains the second cell MBSFN service configuration information, and in step 916, the UE utilizes the second cell MBSFN service configuration information rather than the first cell MBSFN service configuration information to receive the MBMS service from the second cell. For example, referring to FIG. 8, once the UE 820 obtains the MBSFN service configuration information of the eNB 804, the UE 820 uses the obtained MBSFN service configuration information to receive the eMBMS service 826. In addition, once the UE 830 obtains the MBSFN service configuration information of the eNB 806, the UE 830 uses the obtained MBSFN service configuration information to receive the eMBMS service 836.

Figure 10:
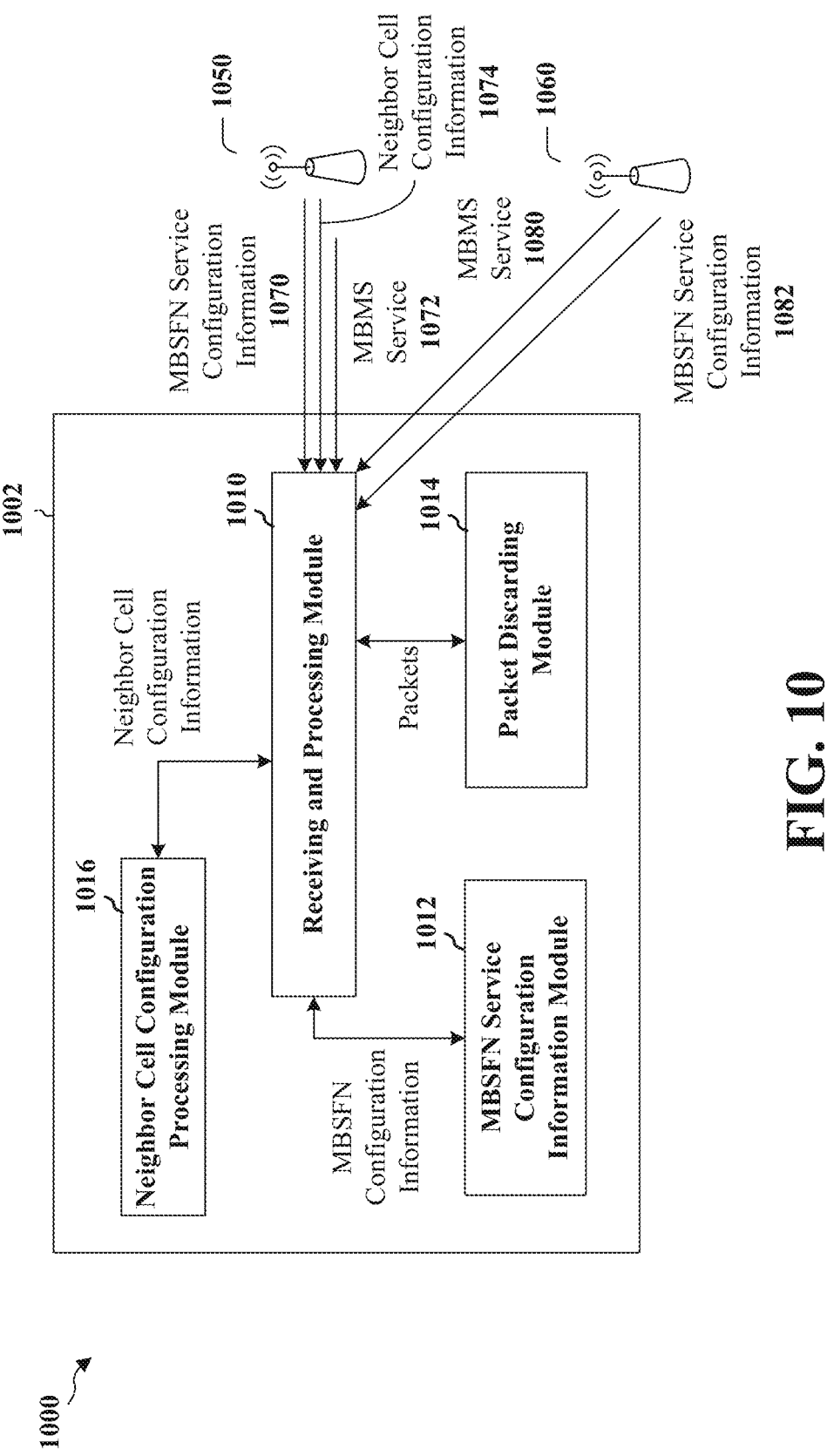
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be a UE. The apparatus includes a receiving and processing module 1010 that is configured to receive an MBMS service 1072 from a first cell 1050 based on first cell Multicast Broadcast Single Frequency Network (MBSFN) service configuration information 1070 of the first cell 1050. In addition, the receiving and processing module 1010 is configured to switch from being served by the first cell 1050 to a second cell 1060. Furthermore, the receiving and processing module 1010 is configured to attempt to receive the MBMS service 1080 from the second cell 1060 by utilizing the first cell MBSFN service configuration information 1070 prior to obtaining second cell MBSFN service configuration information 1082 of the second cell 1060.

The receiving and processing module 1010 may be configured to provide the received MBSFN service configuration information to an MBSFN service configuration information module 1012. The receiving and processing module 1010 may be configured to communicate with the MBSFN service configuration information module 1012 to determine the MBSFN service configuration information to use when attempting to receive an MBMS service. The receiving and processing module 1010 may be configured to receive neighbor cell configuration information 1074 and to provide the received neighbor cell configuration information to a neighbor cell configuration processing module 1016. The neighbor cell configuration processing module 1016 may be configured to determine whether the second cell 1060 may be within the same MBSFN area as the first cell 1050 based on the neighbor cell configuration information.

The receiving and processing module 1010 may be configured to attempt to receive a PDSCH and to receive the MBMS service on MBSFN subframes according to the first cell MBSFN service configuration information 1070 after the switch and prior to obtaining the second cell MBSFN service configuration information 1082. The apparatus may further include a packet discarding module 1014 that is configured to discard packets received through the attempt to receive the MBMS service based on information included in a header of the packets. The receiving and processing module 1010 may be configured to obtain the second cell MBSFN service configuration information 1082 and utilize the second cell MBSFN service configuration information 1082 rather than the first cell MBSFN service configuration information 1070 to receive the MBMS service 1080 from the second cell 1060.

The apparatus may include additional modules that perform each of the steps of the algorithm in the aforementioned flow chart of FIG. 9. As such, each step in the aforementioned flow chart of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
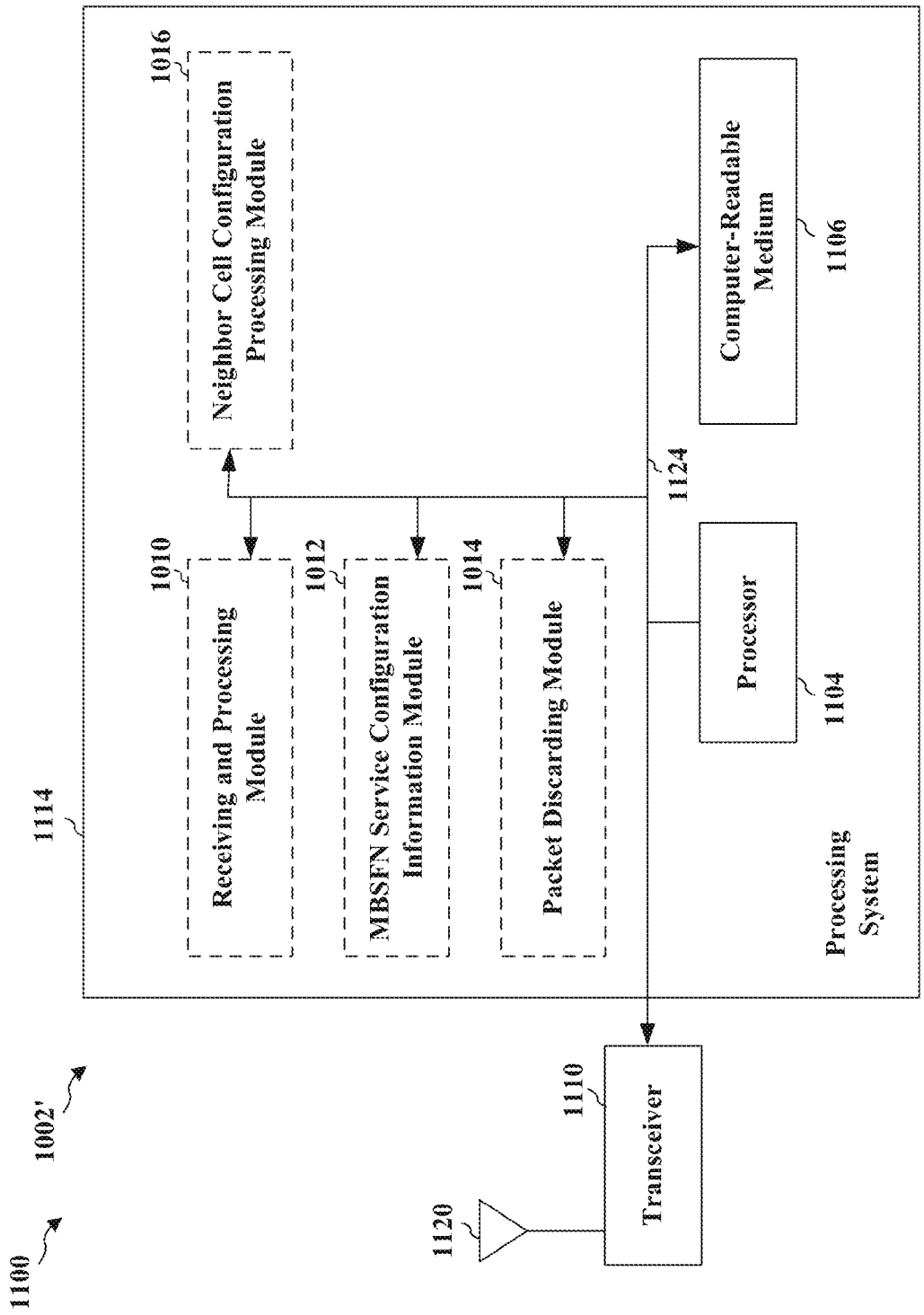
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1010, 1012, 1014, 1016, and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes at least one of the modules 1010, 1012, 1014, and 1016. The modules may be software modules running in the processor 1104, resident/stored in the computer readable medium 1106, one or more hardware modules coupled to the processor 1104, or some combination thereof. The processing system 1114 may be a component of the UE 650 and may include the memory 660 and/or at least one of the TX processor 668, the RX processor 656, and the controller/processor 659.

In one configuration, the apparatus 1002/1002' for wireless communication includes means for receiving an MBMS service from a first cell based on first cell MBSFN service configuration information of the first cell. The apparatus further includes means for switching from being served by the first cell to a second cell. The apparatus further includes means for attempting to receive the MBMS service from the second cell by utilizing the first cell MBSFN service configuration information prior to obtaining second cell MBSFN service configuration information of the second cell. The apparatus may further include means for receiving neighbor cell configuration information prior to the switching from the first cell to the second cell. The apparatus may further include means for receiving the MBSFN service from the second cell based on the first cell MBSFN service configuration information until the second cell MBSFN service configuration information is obtained from the second cell. The apparatus may further include means for obtaining the second cell MBSFN service configuration information, and means for utilizing the second cell MBSFN service configuration information rather than the first cell MBSFN service configuration information to receive the MBMS service from the second cell. The apparatus may further include means for discarding packets received through the attempt to receive the MBMS service based on information included in a header of the packets. The apparatus may further include means for attempting to receive a PDSCH and to receive the MBMS service on MBSFN subframes according to the first cell MBSFN service configuration information after the switching and prior to obtaining the second cell MBSFN service configuration information. The aforementioned means may be one or more of the aforementioned modules of the apparatus 1002 and/or the processing system 1114 of the apparatus 1002' configured to perform the functions recited by the aforementioned means. As described supra, the processing system 1114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a user equipment (UE), comprising:
   receiving a multimedia broadcast multicast service (MBMS) service from a first cell based on first cell Multicast Broadcast Single Frequency Network (MBSFN) service configuration information of the first cell;

determining a neighbor cell configuration;
determining, that the neighbor cell configuration indicates that at least one neighbor cell of a plurality of neighbor cells is within a same MBSFN area as the first cell;
switching from being served by the first cell to a second cell based on determining that at least one neighbor cell is within the MBSFN area as the first cell, wherein the second cell is a neighbor cell of the first cell;
receiving, by the UE, the MBMS service from the second cell based on the first cell MBSFN service configuration information used for receiving the MBMS service from the first cell prior to second cell MBSFN service configuration information being obtained, the first cell MBSFN service configuration information being utilized for the second cell when neighbor cell configuration information indicates that at least one neighbor cell of the plurality of neighbor cells has MBSFN subframe allocations;
obtaining the second cell MBSFN service configuration information of the second cell from the second cell; and
receiving the MBMS service from the second cell based on the obtained second cell MBSFN service configuration information.

2. The method of claim 1, wherein the second cell MBSFN service configuration information comprises a system information block (SIB) 13 (SIB13) from the second cell.

3. The method of claim 2, wherein the second cell MBSFN service configuration information further comprises a SIB 2 (SIB2) from the second cell.

4. The method of claim 3, wherein the first cell MBSFN service configuration information comprises a SIB2 from the first cell including an MBSFN subframe allocation of the first cell, a SIB13 indicating MBSFN subframes on which a multicast control channel (MCCH) can be received on the first cell, and MCCH information providing MBSFN area configuration information of the first cell, and the second cell MBSFN service configuration information comprises the SIB2 from the second cell including an MBSFN subframe allocation of the second cell, the SIB13 indicating MBSFN subframes on which an MCCH can be received on the second cell, and MCCH information providing MBSFN area configuration information of the second cell.

5. The method of claim 1, wherein the neighbor cell configuration information is obtained in at least one of an information element (IE) within a system information block (SIB) 3 for intra-frequency neighbor cell configuration information or in an IE within a SIB 5 for inter-frequency neighbor cell configuration information while in an idle mode, or in an IE within a measurement object for both intra-frequency neighbor cell configuration information and inter-frequency neighbor cell configuration information when in a connected mode.

6. The method of claim 1, wherein the first cell MBSFN service configuration information is utilized for the second cell when the neighbor cell configuration information indicates that neighbor cells have any one of a different MBSFN subframe allocation than the first cell, a different uplink/downlink subframe configuration for time division duplexing (TDD) than the first cell, a subset of the MBSFN subframe allocation of the first cell, or an identical MBSFN subframe allocation as the first cell.

7. The method of claim 1, further comprising:
attempting to receive the MBMS service from the second cell by utilizing the first cell MBSFN service configuration information after the switching.

8. The method of claim 7, further comprising discarding packets received through the attempt to receive the MBMS service based on information included in a header of the packets.

9. The method of claim 1, further comprising attempting to receive both a physical downlink shared channel (PDSCH) and the MBMS service on MBSFN subframes according to the first cell MBSFN service configuration information after the switching and prior to obtaining the second cell MBSFN service configuration information.

10. An apparatus for wireless communication, the apparatus being a user equipment (UE) comprising:
means for receiving a multimedia broadcast multicast service (MBMS) service from a first cell based on first cell Multicast Broadcast Single Frequency Network (MBSFN) service configuration information of the first cell;
means for determining a neighbor cell configuration;
means for determining, that the neighbor cell configuration indicates that at least one neighbor cell of a plurality of neighbor cells is within a same MBSFN area as the first cell;
means for switching from being served by the first cell to a second cell based on determining that at least one neighbor cell is within the MBSFN area as the first cell, wherein the second cell is a neighbor cell of the first cell;
means for receiving, by the UE, the MBMS service from the second cell based on the first cell MBSFN service configuration information used for receiving the MBMS service from the first cell prior to second cell MBSFN service configuration information being obtained, the first cell MBSFN service configuration information being utilized for the second cell when neighbor cell configuration information indicates that at least one neighbor cell of the plurality of neighbor cells neighbor cells has MBSFN subframe allocations;
means for obtaining the second cell MBSFN service configuration information of the second cell from the second cell; and
means for receiving the MBMS service from the second cell based on the obtained second cell MBSFN service configuration information.

11. The apparatus of claim 10, wherein the second cell MBSFN service configuration information comprises a system information block (SIB) 13 (SIB13) from the second cell.

12. The apparatus of claim 11, wherein the second cell MBSFN service configuration information further comprises a SIB 2 (SIB2) from the second cell.

13. The apparatus of claim 12, wherein the first cell MBSFN service configuration information comprises a SIB2 from the first cell including an MBSFN subframe allocation of the first cell, a SIB13 indicating MBSFN subframes on which a multicast control channel (MCCH) can be received on the first cell, and MCCH information providing MBSFN area configuration information of the first cell, and the second cell MBSFN service configuration information comprises the SIB2 from the second cell including an MBSFN subframe allocation of the second cell, the SIB13 indicating MBSFN subframes on which an MCCH can be received on the second cell, and MCCH information providing MBSFN area configuration information of the second cell.

14. The apparatus of claim 10, wherein the neighbor cell configuration information is obtained in at least one of an information element (IE) within a system information block (SIB) 3 for intra-frequency neighbor cell configuration information or in an IE within a SIB 5 for inter-frequency neighbor cell configuration information while in an idle mode, in an IE within a measurement object for both intra-frequency neighbor cell configuration information and inter-frequency neighbor cell configuration information when in a connected mode.

15. The apparatus of claim 10, wherein the first cell MBSFN service configuration information is utilized for the second cell when the neighbor cell configuration information indicates that neighbor cells have any one of a different MBSFN subframe allocation than the first cell, a different uplink/downlink subframe configuration for time division duplexing (TDD) than the first cell, a subset of the MBSFN subframe allocation of the first cell, or an identical MBSFN subframe allocation as the first cell.

16. The apparatus of claim 10, further comprising:
means for attempting to receive the MBMS service from the second cell by utilizing the first cell MBSFN service configuration information after the switching.

17. The apparatus of claim 16, further comprising means for discarding packets received through the attempt to receive the MBMS service based on information included in a header of the packets.

18. The apparatus of claim 10, further comprising means for attempting to receive both a physical downlink shared channel (PDSCH) and the MBMS service on MBSFN subframes according to the first cell MBSFN service configuration information after the switching and prior to obtaining the second cell MBSFN service configuration information.

19. An apparatus for wireless communication, the apparatus being a user equipment (UE), comprising:
a memory; and
at least one processor coupled to the memory and configured to:
receive a multimedia broadcast multicast service (MBMS) service from a first cell based on first cell Multicast Broadcast Single Frequency Network (MBSFN) service configuration information of the first cell;
determine a neighbor cell configuration;
determine that the neighbor cell configuration indicates that at least one neighbor cell of a plurality of neighbor cells is within a same MBSFN area as the first cell;
switch from being served by the first cell to a second cell based on determining that at least one neighbor cell is within the MBSFN area as the first cell, wherein the second cell is a neighbor cell of the first cell;
receive, by the UE, the MBMS service from the second cell based on the first cell MBSFN service configuration information used for receiving the MBMS service from the first cell prior to second cell MBSFN service configuration information being obtained, the first cell MBSFN service configuration information being utilized for the second cell when neighbor cell configuration information indicates that at least one neighbor cell of the plurality of neighbor cells has MBSFN subframe allocations;
obtain the second cell MBSFN service configuration information of the second cell from the second cell; and
receive the MBMS service from the second cell based on the obtained second cell MBSFN service configuration information.

20. The apparatus of claim 19, wherein the second cell MBSFN service configuration information comprises a system information block (SIB) 13 (SIB13) from the second cell.

21. The apparatus of claim 20, wherein the second cell MBSFN service configuration information further comprises a SIB 2 (SIB2) from the second cell.

22. The apparatus of claim 21, wherein the first cell MBSFN service configuration information comprises a SIB2 from the first cell including an MBSFN subframe allocation of the first cell, a SIB13 indicating MBSFN subframes on which a multicast control channel (MCCH) can be received on the first cell, and MCCH information providing MBSFN area configuration information of the first cell, and the second cell MBSFN service configuration information comprises the SIB2 from the second cell including an MBSFN subframe allocation of the second cell, the SIB13 indicating MBSFN subframes on which an MCCH can be received on the second cell, and MCCH information providing MBSFN area configuration information of the second cell.

23. The apparatus of claim 19, wherein the neighbor cell configuration information is obtained in at least one of an information element (IE) within a system information block (SIB) 3 for intra-frequency neighbor cell configuration information or in an IE within a SIB 5 for inter-frequency neighbor cell configuration information while in an idle mode, in an IE within a measurement object for both intra-frequency neighbor cell configuration information and inter-frequency neighbor cell configuration information when in a connected mode.

24. The apparatus of claim 19, wherein the first cell MBSFN service configuration information is utilized for the second cell when the neighbor cell configuration information indicates that neighbor cells have any one of a different MBSFN subframe allocation than the first cell, a different uplink/downlink subframe configuration for time division duplexing (TDD) than the first cell, a subset of the MBSFN subframe allocation of the first cell, or an identical MBSFN subframe allocation as the first cell.

25. The apparatus of claim 19, wherein the at least one processor is further configured to:
attempt to receive the MBMS service from the second cell by utilizing the first cell MBSFN service configuration information after the switching.

26. The apparatus of claim 25, wherein the at least one processor is further configured to discard packets received through the attempt to receive the MBMS service based on information included in a header of the packets.

27. The apparatus of claim 19, wherein the at least one processor is further configured to attempt to receive both a physical downlink shared channel (PDSCH) and the MBMS service on MBSFN subframes according to the first cell MBSFN service configuration information after the switching and prior to obtaining the second cell MBSFN service configuration information.

28. A non-transitory computer-readable medium storing computer executable code for wireless communication, comprising code configured to:
receive, by a user equipment (UE), a multimedia broadcast multicast service (MBMS) service from a first cell based on first cell Multicast Broadcast Single Frequency Network (MBSFN) service configuration information of the first cell;

determine a neighbor cell configuration;
determine that the neighbor cell configuration indicates that at least one neighbor cell of a plurality of neighbor cells is within a same MBSFN area as the first cell;
switch from being served by the first cell to a second cell based on determining that at least one neighbor cell is within the MBSFN area as the first cell, wherein the second cell is a neighbor cell of the first cell;
receive, by the UE, the MBMS service from the second cell based on the first cell MBSFN service configuration information used for receiving the MBMS service from the first cell prior to second cell MBSFN service configuration information being obtained, the first cell MBSFN service configuration information being utilized for the second cell when neighbor cell configuration information indicates that at least one neighbor cell of a plurality of neighbor cells has MBSFN subframe allocations;
obtain the second cell MBSFN service configuration information of the second cell from the second cell; and
receive the MBMS service from the second cell based on the obtained second cell MBSFN service configuration information.

29. The method of claim 7, wherein the attempting to receive the MBMS service from the second cell by utilizing the first cell MBSFN service configuration information comprises applying the first cell MBSFN service configuration information of the first cell to the second cell without previously determining whether the second cell is within a same MBSFN area as the first cell.

* * * * *